United States Patent
Gutt

(10) Patent No.: US 9,294,321 B2
(45) Date of Patent: Mar. 22, 2016

(54) BIT SIGNAL STRUCTURE FOR DIFFERENTIALLY ENCODED BROADCASTS

(75) Inventor: Gregory M. Gutt, Ashburn, VA (US)

(73) Assignee: The Boeing Company, Chicago, IL (US)

( * ) Notice: Subject to any disclaimer, the term of this patent is extended or adjusted under 35 U.S.C. 154(b) by 1397 days.

(21) Appl. No.: 12/780,365

(22) Filed: May 14, 2010

(65) Prior Publication Data

US 2015/0288415 A1    Oct. 8, 2015

(51) Int. Cl.
*H04L 27/00* (2006.01)
*H04L 27/233* (2006.01)
*G01S 19/02* (2010.01)

(52) U.S. Cl.
CPC ............ *H04L 27/2331* (2013.01); *G01S 19/02* (2013.01)

(58) Field of Classification Search
CPC ............................ G01S 19/02; H04L 27/2331
USPC ......... 375/259, 140, 145, 149, 150, 308, 146; 370/535
See application file for complete search history.

(56) References Cited

U.S. PATENT DOCUMENTS

| | | | |
|---|---|---|---|
| 4,301,417 A | 11/1981 | Jansen et al. | |
| 4,527,275 A | 7/1985 | Russell | |
| 5,233,630 A * | 8/1993 | Wolf | 375/308 |
| 5,594,454 A * | 1/1997 | Devereux et al. | 342/357.395 |
| 5,862,180 A * | 1/1999 | Heinz | 375/244 |
| 6,519,275 B2 * | 2/2003 | Callaway et al. | 375/140 |
| 6,934,308 B1 * | 8/2005 | Yonenaga et al. | 370/535 |
| 6,940,837 B1 * | 9/2005 | Kotake | 370/335 |
| 7,042,392 B2 | 5/2006 | Whelan et al. | |
| 7,145,969 B1 * | 12/2006 | Hu et al. | 375/343 |
| 7,372,400 B2 | 5/2008 | Cohen et al. | |
| 7,468,696 B2 | 12/2008 | Bornholdt | |
| 7,489,926 B2 | 2/2009 | Whelan et al. | |
| 7,579,986 B2 | 8/2009 | DiEsposti | |
| 7,579,987 B2 | 8/2009 | Cohen et al. | |
| 7,583,225 B2 | 9/2009 | Cohen et al. | |
| 7,619,559 B2 | 11/2009 | DiEsposti | |
| 7,688,261 B2 | 3/2010 | DiEsposti | |
| 2004/0052302 A1 * | 3/2004 | Black et al. | 375/146 |
| 2004/0258131 A1 * | 12/2004 | Margon | 375/130 |
| 2005/0159891 A1 | 7/2005 | Cohen et al. | |
| 2008/0059059 A1 | 3/2008 | Cohen et al. | |
| 2008/0112491 A1 * | 5/2008 | Shaanan et al. | 375/253 |
| 2008/0112507 A1 * | 5/2008 | Smith et al. | 375/308 |
| 2008/0143605 A1 | 6/2008 | Bornholdt | |
| 2008/0146246 A1 | 6/2008 | Bornholdt | |

(Continued)

FOREIGN PATENT DOCUMENTS

EP    1788766 A2    5/2007

OTHER PUBLICATIONS

Digital Modulation Techniques, 2nd Edition, Chapter 4, pp. 135-205 Cleveland State University Apr. 1, 2006.

(Continued)

*Primary Examiner* — Shuwang Liu
*Assistant Examiner* — Helene Tayong
(74) *Attorney, Agent, or Firm* — Toler Law Group, PC

(57) ABSTRACT

In one embodiment, a communication device comprises a differential encoder to receive data for transmission and encode the data for transmission using a set of codes that, when processed by the differential encoder, place the differential encoder in a known state and generate uncorrelated output sequences.

45 Claims, 4 Drawing Sheets

(56) References Cited

U.S. PATENT DOCUMENTS

| | | |
|---|---|---|
| 2008/0169958 A1* | 7/2008 | Cohen et al. ............... 342/14 |
| 2009/0174597 A1 | 7/2009 | DiLellio et al. |
| 2009/0228210 A1 | 9/2009 | Gutt |
| 2009/0315764 A1 | 12/2009 | Cohen et al. |
| 2009/0315769 A1 | 12/2009 | Whelan et al. |
| 2010/0054348 A1* | 3/2010 | Choi et al. ............... 375/259 |
| 2010/0310009 A1* | 12/2010 | Lakkis ............... 375/308 |
| 2011/0163913 A1* | 7/2011 | Cohen et al. ............ 342/357.29 |

OTHER PUBLICATIONS

International Search Report and Written Opinion of the International Search Authority for International Application No. PCT/US2011/026500 from the International Searching Authority, mailed on Jun. 24, 2011, 13 pages.

Cavallini, A., et al., "Chip-Level Differential Encoding/Detection of Spread-Spectrum Signals for CDMA Radio Transmission over Fading Channels", IEEE Transactions on Communications, Apr. 1997, vol. 45, No. 4, Piscataway, NJ, pp. 456-463.

Schober, R., et al., "Multiple-Bit Differential Detection of DOQPSK—Revisited", IEEE International Conference on Communications, May 2005, vol. 1, IEEE, Piscataway, NJ, pp. 588-592.

Wada, T., et al., "A new M-ary/SSMA Scheme Applicable in LEO Satellite Communication Systems", Global Telecommunications Conference 1996, Nov. 1996, vol. 1, IEEE, New York, NY, pp. 384-389.

\* cited by examiner

BIT SIGNAL STRUCTURE FOR DIFFERENTIALLY ENCODED BROADCASTS

RELATED APPLICATIONS

None

BACKGROUND

The subject matter described herein relates to electronic communication, and more particularly to signal encoding techniques which may be used in wireless communication systems such as satellite communication systems. In addition, the subject matter described herein relates to techniques to perform geolocation using low-earth orbit (LEO) satellite signals.

The Global Positioning System (GPS) is a space-based, world-wide navigation system which includes a space, ground, and user segment. The locations of the satellites are used as reference points to calculate positions of the GPS user receiver, which is usually accurate to within meters, and sometimes even within centimeters. Each of the satellites, the ground stations, and the GPS user receiver has preprogrammed timing signals that start at precise times. In order to lock on to the signals broadcasted by the satellites, the ground station and GPS user receiver slew their respective internal generated signals relative to time as predicted by their respective internal clocks. When the signals are locked, the GPS user receiver makes ranging measurements to each satellite called pseudoranges. These pseudorange measurements include the actual ranges to the satellites, in addition to an error associated with the receiver clock time offset relative to GPS time, plus other smaller errors. The ground stations included in the GPS control segment network provide ranging measurements which are used to generate predictions for the satellites clocks and orbits. These predictions are periodically uploaded to the satellites and the satellites broadcast this data to the user receiver to support the user receiver positioning function.

Due in part to concerns about jamming of GPS signals and power limitations on GPS signals, low Earth orbiting (LEO) satellite constellations, such as Iridium, have been suggested as a mechanism to allowing navigation without using GPS, or in conjunction with GPS systems. The Iridium satellite constellation is a constellation of low earth orbiting satellites at a height of approximately 485 mi (781 km), with six near polar orbits with an inclination of 86.4°, and maintains an orbital velocity of approximately 17,000 mph (27,000 km/h). The constellation is used to provide global satellite communication services including voice and data coverage to satellite phones, pagers, and integrated transceivers around the globe. The constellation includes sixty-six active satellites in orbit which orbit from pole to pole at an orbital period of just over 100 minutes. The orbit design produces counter-rotating planes of satellites next to one another traveling in opposite directions. In addition, the satellites use cross-linking technology to relay data across the constellation. Each Iridium satellite has 48 spot beams as part of the constellations uniquely-identifiable beam geometry that project onto the surface of the earth.

Various techniques for using the time standard from the LEO satellites to augment the functionality of the GPS system include such patents as U.S. Pat. RE 37,256, issued to Cohen, et al. entitled, "System and Method For Generating Precise Position Determinations;" U.S. Pat. No. 5,812,961 issued to Enge, et al. entitled, "Method And Receiver Using A Low Earth Orbiting Satellite Signal To Augment The Global Positioning System;" U.S. Pat. No. 5,944,770 issued to Enge, et al. entitled, "Method And Receiver Using A Low Earth Orbiting Satellite Signal To Augment The Global Positioning System;" and U.S. Pat. No. 6,373,432 issued to Rabinowitz, et al. entitled "System Using LEO Satellites For Centimeter-Level Navigation." The disclosures of these patents are incorporated herein by reference in their respective entireties.

The Iridium system employs a signal processing scheme known as differential encoding to encode and transmit quadrature phase shift keyed (QPSK) modulated broadcasts. During the differential encoding process the In-Phase and Quadrature modulated bits (Is and Qs) of a broadcast are re-coded as such that the output state of the differential encoder is a function of both the current (I,Q) input to the differential encoder and the previous (I,Q) state of the differential encoder. This differential encoding scheme raises issues when using pseudo-random code sequences and associated correlation detection methods because for every desired code that is intended to transmit there are multiple possible broadcasts. This complicates the correlation processing in the user receiver. Instead of searching and correlating for a group of possible code messages the receiver instead must search through a multiple of the number of messages broadcast. This increases the memory, processing, and power requirements of the user receiver. Furthermore, it weakens the separation between the codes and increases the likelihood that one code might be mistaken for another in the correlation process.

Accordingly, additional encoding techniques for use with LEO satellite systems such as Iridium may find utility.

BRIEF DESCRIPTION OF THE DRAWINGS

The detailed description is described with reference to the accompanying figures.

SUMMARY

Described herein are methods to encode data for transmission using a differential encoder. Also described are transmitters adapted to implement such transmissions and communication systems which utilize differential encoders.

In some embodiments a communication device comprises a differential encoder to receive data for transmission and encode the data for transmission using a set of codes that, when processed by the differential encoder, place the differential encoder in a known state and generate uncorrelated output sequences.

In other embodiments a method to encode data for transmission using a differential encoder comprises receiving, in a differential encoder, data for transmission, and encoding the data for transmission using a set of codes that, when processed by the differential encoder, place the differential encoder in a known state and generate uncorrelated output sequences.

DETAILED DESCRIPTION

In the following description, numerous specific details are set forth to provide a thorough understanding of various embodiments. However, it will be understood by those skilled in the art that the various embodiments may be practiced without the specific details. In other instances, well-known methods, procedures, components, and elements have not been illustrated or described in detail so as not to obscure the particular embodiments.

The subject matter of this application is described primarily in the context of differential encoding in QPSK modulation schemes implemented by Iridium satellites. However, one skilled in the art will recognize that the techniques described here are readily applicable to other systems which utilize differential encoding in either QPSK modulation schemes or BPSK modulation schemes. Such systems may include other mobile communication systems, e.g., airborne communication systems or the like, as well as, stationary communication platforms including but not limited to a ship or a cell phone tower.

Described herein are differential encoding techniques which may be used in transmitters associated with low Earth orbit (LEO) satellite systems. In some embodiments the differential encoding techniques use preselected codes which exhibit the property of leaving the transmitter's differential encoder in a known logical state. For example, some preselected codes leave the transmitter in the same logical state as it was in prior to transmission. This results in a 1:1 mapping between input data and output data for the differential encoder, which facilitates signal correlation and selection at a receiver.

Figure 1:
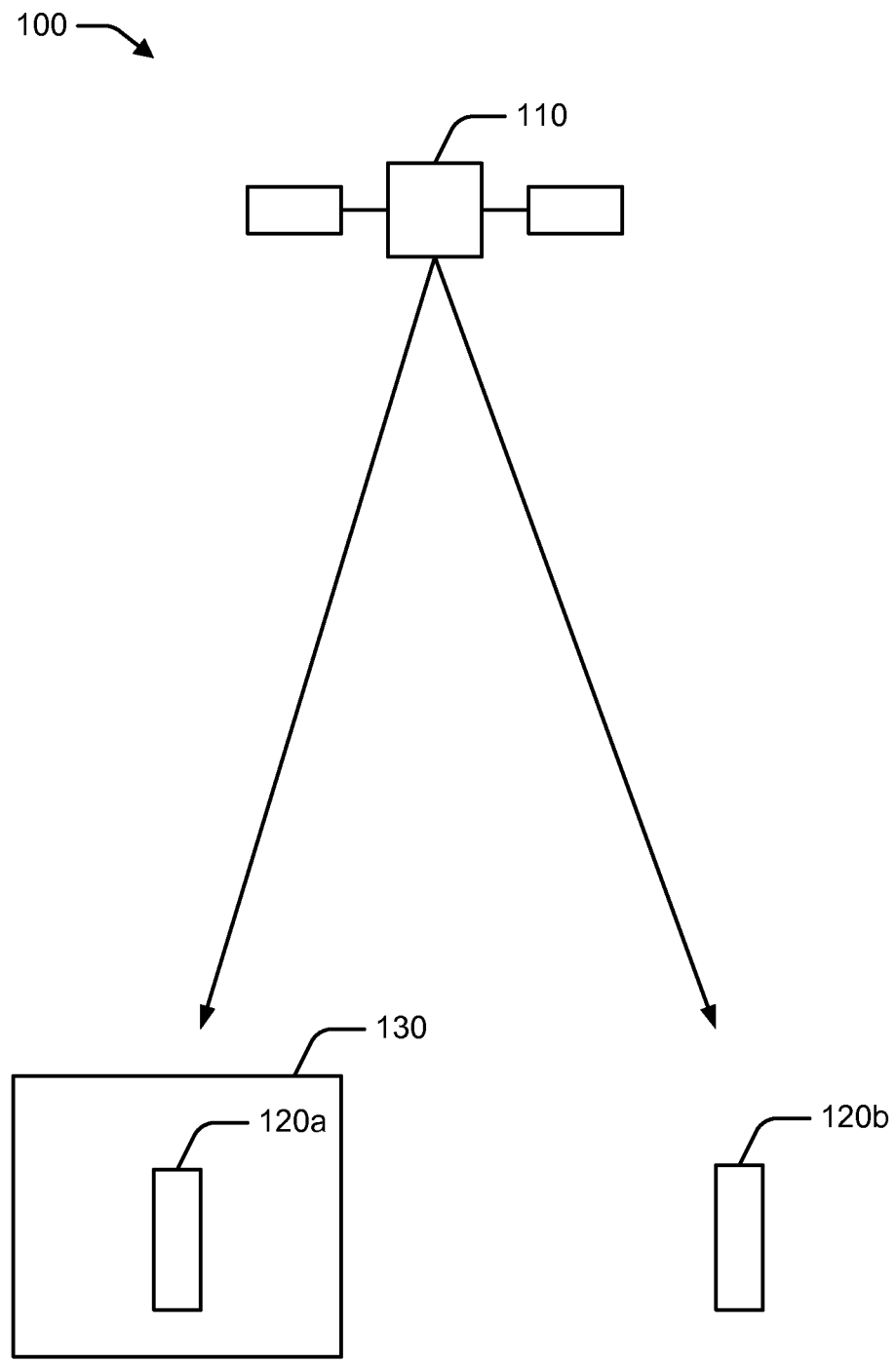
FIG. 1 is a schematic illustration of a low Earth orbit (LEO) satellite communication system, according to embodiments.

FIG. 1 is a schematic illustration of a low Earth orbit (LEO) satellite communication system 100, according to embodiments. Referring to FIG. 1, in some embodiments a system 100 comprises one or more LEO satellites 110 in communication with one or more receiving devices 120a, 120b, which may be referred to generally by the reference numeral 120.

In some embodiments the LEO satellites 110 may be embodied as satellites in the Iridium satellite constellation. A typical satellite communication system such as Iridium is designed to work under conditions where the satellite signal has a received power above the ambient noise floor.

Receiving devices 120 may be implemented as communication devices such as satellite or cellular phones or as components of a communication or computing device, e.g., a personal computer, laptop computer, personal digital assistant or the like. Alternatively, receiving devices 120 may be implemented as position locating or navigation devices analogous to devices used in connection with the global positioning system (GPS). The GPS system utilizes spread-spectrum access techniques which enables the receivers to pick up a signal even when the received broadcast is below the noise floor. In systems such as GPS, pseudo-random codes are broadcast by satellites, and correlation techniques are used to pull the signal out of the noise.

GPS systems have relatively poor performance within an attenuated (e.g. indoor) environment 130 due to insufficient signal power which has created a need for other systems that can perform better in these environments. Iridium satellites broadcast with significantly more power than GPS transmissions. In an example, a receiver unit configured to work with signals received from a LEO satellite, such as an Iridium satellite, may work with signal levels of less than about 45 dB of attenuation at the antenna of a receiving device 120. Thus, by leveraging the LEO based Iridium satellite, the Iridium-configured receiver unit may operate at about 15-20 dB below where a typical GPS-configured receiver unit would stop working.

Various satellite communication systems, including Iridium, use a differential encoding signal processing scheme to encode and transmit quadrature phase shift keyed (QPSK) modulated broadcasts. During the differential encoding process the In-Phase (I) and Quadrature (Q) modulated bits of a broadcast are re-coded such that the output of the differential encoder is a function of the current I/Q state and the previous I/Q state. Table I is a typical differential encoding scheme used for QPSK systems. Any given message (represented by a string of bits) is differentially encoded before it is broadcast.

TABLE I

Differential Encoding Scheme

| Current Input State | | Previous Output State | | Current Output State | |
|---|---|---|---|---|---|
| I | Q | I | Q | I | Q |
| 0 | 0 | 0 | 0 | 0 | 0 |
| 0 | 0 | 0 | 1 | 0 | 1 |
| 0 | 0 | 1 | 0 | 1 | 0 |
| 0 | 0 | 1 | 1 | 1 | 1 |
| 0 | 1 | 0 | 0 | 1 | 0 |
| 0 | 1 | 0 | 1 | 0 | 0 |
| 0 | 1 | 1 | 0 | 1 | 1 |
| 0 | 1 | 1 | 1 | 0 | 1 |
| 1 | 0 | 0 | 0 | 0 | 1 |
| 1 | 0 | 0 | 1 | 1 | 1 |
| 1 | 0 | 1 | 0 | 0 | 0 |
| 1 | 0 | 1 | 1 | 1 | 0 |
| 1 | 1 | 0 | 0 | 1 | 1 |
| 1 | 1 | 0 | 1 | 1 | 0 |
| 1 | 1 | 1 | 0 | 0 | 1 |
| 1 | 1 | 1 | 1 | 0 | 0 |

The current output of the differential encoding process is a function of the current I/Q state and the previous I/Q state. By way of example, a bit coded message (A) input to a differential encoder will actually be broadcast in a form (B) which can have four different versions (B1, B2, B3, B4) depending on the previous state (C) of the differential encoder. The cases presented in Table II, below are exemplary:

TABLE II

Encoder Transformations

Case 1:

| A = 00000000 | Pre-encoded message |
|---|---|
| C = 00 | |
| B1 = 00000000 | Broadcast message |

Case 2:

| A = 00000000 | Pre-encoded message |
|---|---|
| C = 01 | Previous state of the differential encoder |
| B2 = 01010101 | Broadcast message |

Case 3:

| A = 00000000 | Pre-encoded message |
|---|---|
| C = 10 | Previous state of the differential encoder |
| B3 = 10101010 | Broadcast message |

Case 4:

| A = 00000000 | Pre-encoded message |
|---|---|
| C = 11 | Previous state of the differential encoder |
| B4 = 11111111 | Broadcast message |

Thus, for any subsequent given message A, there are four possible differentially encoded versions of the message B, which emerges from the differential encoder. The message B is dependent on the previous encoder state C, creating a 1:4 input code (A) to potential output (B) code ratio.

The differential encoding scheme used on Iridium and other communication satellites generates issues in using pseudo-random code sequences and associated correlation detection methods because every desired code, message A, that is inputted into the differential encoder can generate four possible broadcasts. This 1:4 ratio significantly complicates the correlation processing in the user receiver. Instead of searching and correlating for a single group of possible code messages, the receiver instead must search through 4× this number of messages. This increases the memory, processing, and power requirements of the user receiver. Furthermore, it weakens the separation between the codes and increases the likelihood that one code might be mistaken for another in the correlation process.

In one aspect there is described herein systems and methods for differential encoding in which a differential encoder uses a set of codes that, when processed by the differential encoder, places the differential encoder into a known (I,Q) state after an input data stream has been processed. Placing the differential encoder into a known (I,Q) state eliminates the 1:4 ratio of inputs to outputs.

Figure 2:
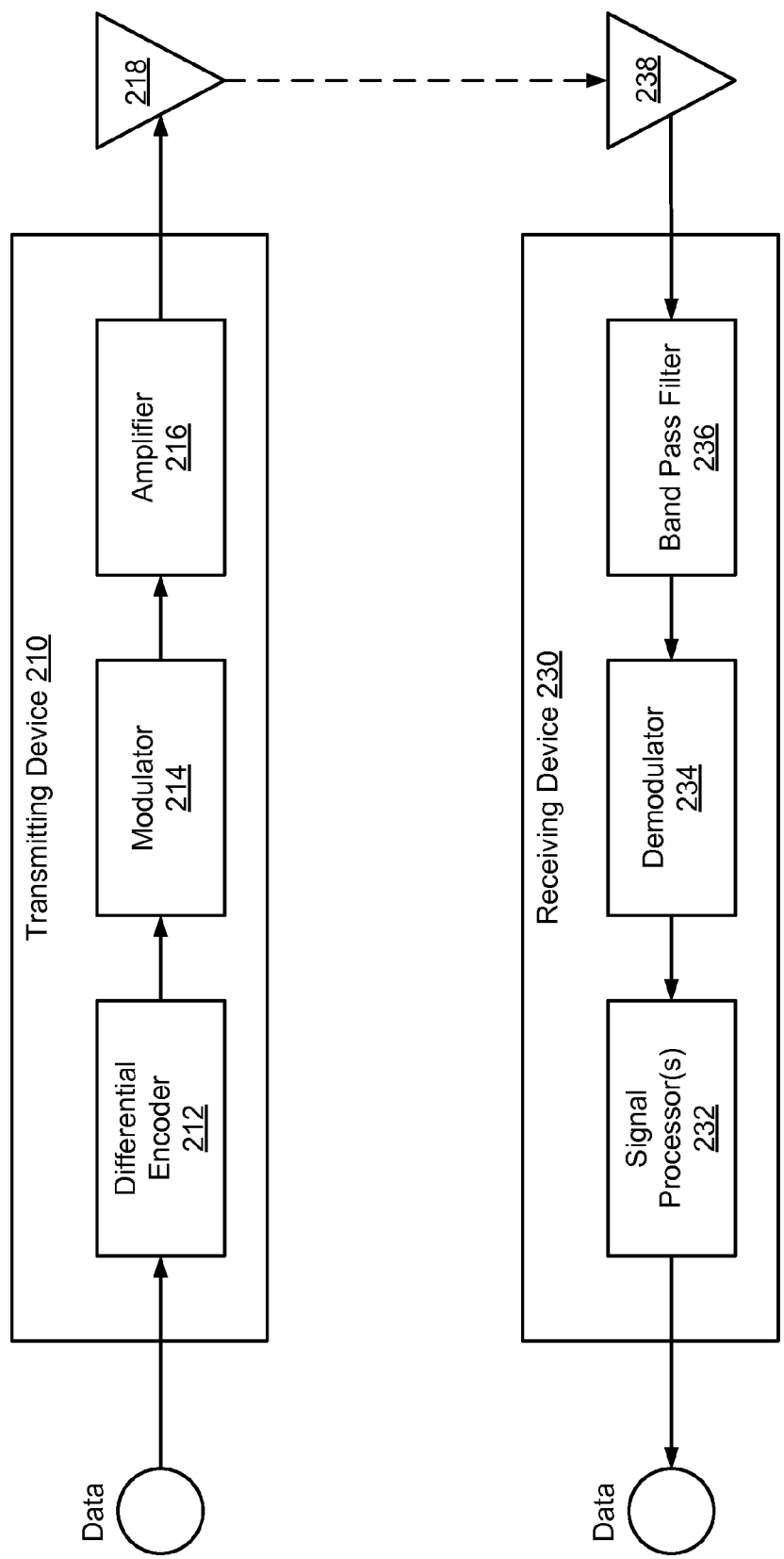
FIG. 2 is a schematic illustration of components of a transmitting device and a receiving device, according to embodiments

In some embodiments, methods of the present invention may be implemented in a transmitting device such as, e.g., a transmitter of a LEO satellite such as the satellite 110 depicted in FIG. 1. FIG. 2 is a schematic illustration of components of a transmitting device and a receiving device, according to embodiments. Referring to FIG. 2, in one embodiment a transmitting device 210 comprises a differential encoder 212, a modulator 214, and an amplifier 216. The transmitting device 210 is coupled to an antenna 218. A receiving device 230 comprises one or more signal processor (s) 232, a demodulator 234, and a band pass filter 236. The receiving device 230 is coupled to an antenna 238.

Figure 3:
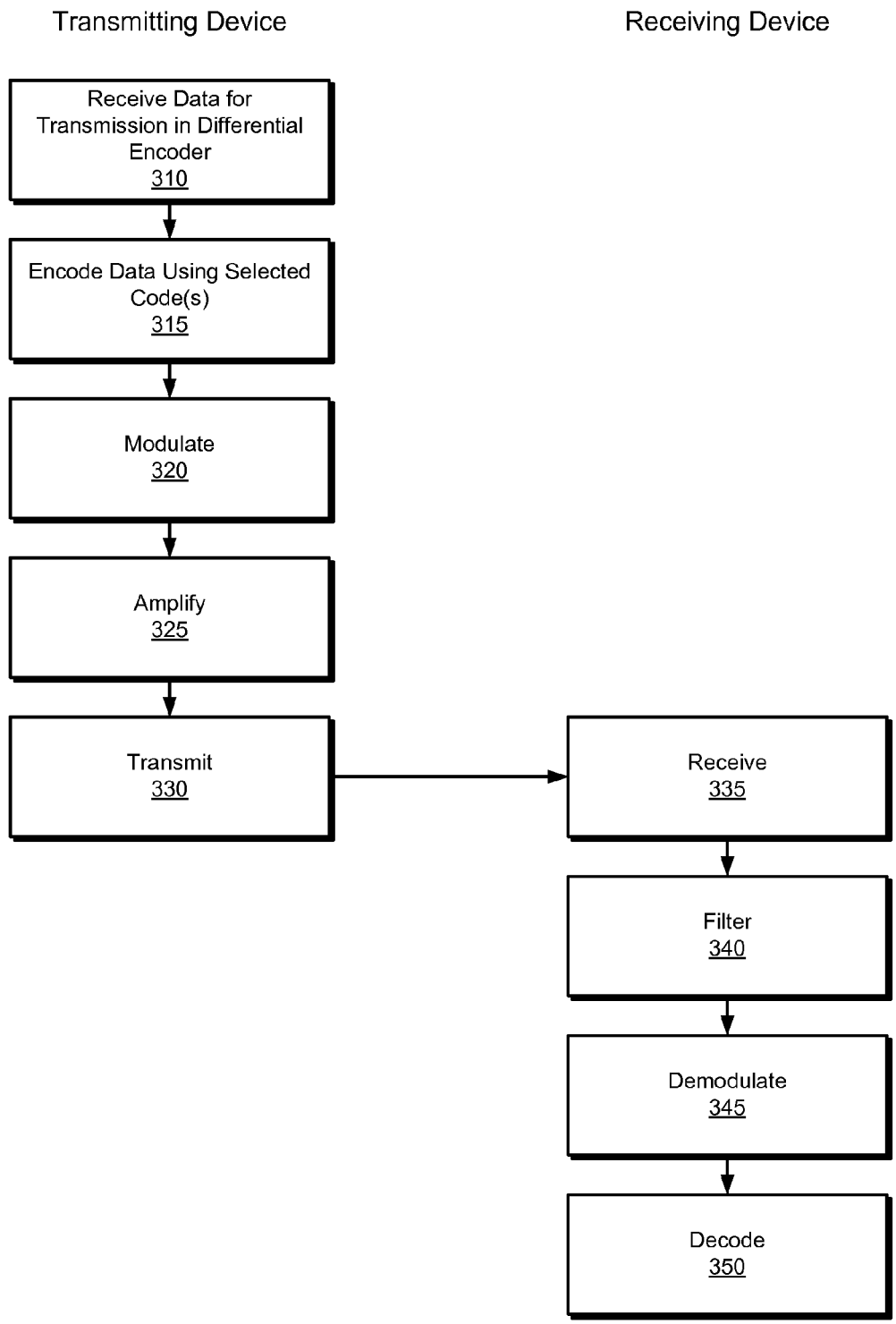
FIG. 3 is a flowchart illustrating operations in a method to implement a bit signal structure for differentially encoded broadcasts, according to embodiments.

Operations of the transmitting device 210 and the receiving device 230 will be explained with reference to FIG. 2, and with reference to FIG. 3, which is a flowchart illustrating operations in a method to implement a bit signal structure for differentially encoded broadcasts, according to embodiments. Referring to FIGS. 2 and 3, at operation 310 data for transmission is received in the differential encoder 212 of the transmitting device 210.

At operation 315 the data is differentially encoded using selected codes. In some embodiments the differential encoder 212 differentially encodes the data using a set of codes that have the property that when they are transmitted they always leave the differential encoder 212 in a known (I,Q) state, such as (00). This ensures a 1:1 correlation between the input code (A) and the output code (B) of the differential encoder 212, which in turn ensures that the previous message does not present an ambiguity to the current message in spite of the system's differential encoder. Thus, the code word always rotates the differential encoder 212 back to its initial phase (00) in the above example.

At operation 320 the data signal output from the differential encoder is modulated by the modulator 214. The modulated signal is amplified (operation 325) by the amplifier 216 and passed to the antenna 218 for transmission (operation 330).

The broadcast signal is received (operation 335) at the antenna 238 coupled to the receiving device 230. The signal is passed from the antenna 238 to a band pass filter, which filters (operation 340) out undesired frequency ranges, then is demodulated (operation 345) by demodulator 234 and then passed to a signal processor 232. In relevant part, the signal processor 232 may decode (operation 350) the signal to recover the original message. The original message may then be used in a position location process.

In another aspect, the differential encoder 212 may implement a coding technique referred to herein as super bit encoding (SBE), which is designed to improve the signal detection of messages in noisy environments. In some embodiments the differential encoder 212 encodes messages with a processing gain equivalent to:

$$G=N/n;$$

where
  G=processing gain,
  N=# of bits in the code message,
  n=# of information bits in the message.

By way of example, if the 10 message bits are used to represent 1 information bit, the processing gain is equal to 10 (or 10 dB). Where the dB conversion factor is: 10 log 10(G). Super bit sequences may be constructed using a string of N pseudo-random bits, where each code has the correlation properties as previously described. N may be implemented as an integer, such that output sequences from the differential encoder 212 are uncorrelated with each other to the extent possible in order to preserve the differentiation amongst code words.

For example, two SBE bit sequences are set forth below. Each bit sequence uses a 10 bit sequences to represent a 0 or a 1, respectively. As an example of this embodiment, the bit codes presented in Case 1 through Case 4 in Table III below illustrate a 20 bit input code after which four zeros (0000) are appended as a test sequence, A. The four zeros appended to the end of the 20 bit sequence help identify the state C of the differential encoder 212. In addition, D identifies the post-encoded state of the differential encoder 212. A preferred output code results in C=D, meaning that the post-encoded state of the differential encoder 212 includes four zeroes also at the end of the message showing that the state of the encoder has been reset to the initial state of the differential encoder 212. By contrast, the examples illustrated in Case 5 through Case 8 do not result in resetting the post-encoded state of the differential encoder 212 to the initial pre-encoded state of the differential encoder 212.

TABLE III

Example Bit Codes

| Case 1: | |
|---|---|
| A = 101111001111011100110000 | Pre-encoded message |
| C = 0000 | Previous state of the differential encoder |
| B = 100110100110001111000000 | Broadcast message |
| D = 0000 | Post-encoded state of the differential encode |
| Case 2: | |
| A = 101011110001001010100000 | Pre-encoded message |
| C = 0000 | Previous state of the differential encoder |
| B = 101100111110101101000000 | Broadcast message |
| D = 0000 | Post-encoded state of the differential encoder |
| Case 3: | |
| A = 101010101110101101010000 | Pre-encoded message |
| C = 0000 | Previous state of the differential encoder |
| B = 101101001101001110000000 | Broadcast message |
| D = 0000 | Post-encoded state of the differential encoder |

TABLE III-continued

Example Bit Codes

Case 4:

| | |
|---|---|
| A = 10111000011011001000000 | Pre-encoded message |
| C = 0000 | Previous state of the differential encoder |
| B = 10010000010011110000000 | Broadcast message |
| D = 0000 | Post-encoded state of the differential encoder |

Case 5:

| | |
|---|---|
| A = 01110100001110000010000 | Pre-encoded message |
| C = 0000 | Previous state of the differential encoder |
| B = 01100000001101010111111 | Broadcast message |
| D = 1111 | Post-encoded state of the differential encoder |

Case 6:

| | |
|---|---|
| A = 00110110101001001110000 | Pre-encoded message |
| C = 0000 | Previous state of the differential encoder |
| B = 00111001110101110010101 | Broadcast message |
| D = 0101 | Post-encoded state of the differential encoder |

Case 7:

| | |
|---|---|
| A = 10011001011010111010000 | Pre-encoded message |
| C = 0000 | Previous state of the differential encoder |
| B = 01100000001101010111111 | Broadcast message |
| D = 1111 | Post-encoded state of the differential encoder |

Case 8:

| | |
|---|---|
| A = 11001111011100100000000 | Pre-encoded message |
| C = 0000 | Previous state of the differential encoder |
| B = 11110011011011101010101 | Broadcast message |
| D = 1010 | Post-encoded state of the differential encoder |

In some embodiments, the super bit encoding concept can be extended to the idea of representing several Gray codes within a single communication satellite message burst such as an Iridium satellite message burst. The burst data structure includes information bits that provide identifying information as well as payload data, which is differentially encoded. In some embodiments there are 256 data bits (N) in a message burst in which multiple messages are to be transmitted, where n=8 or 256 possible messages. SBE sequences can be defined for a cases in which n=1 for use in a communications satellite differential decoder, using two 10 bit sequences to represent a 0 or a 1. In this case N=10 and n=1 and therefore the signal gain G=10.

Figure 4:
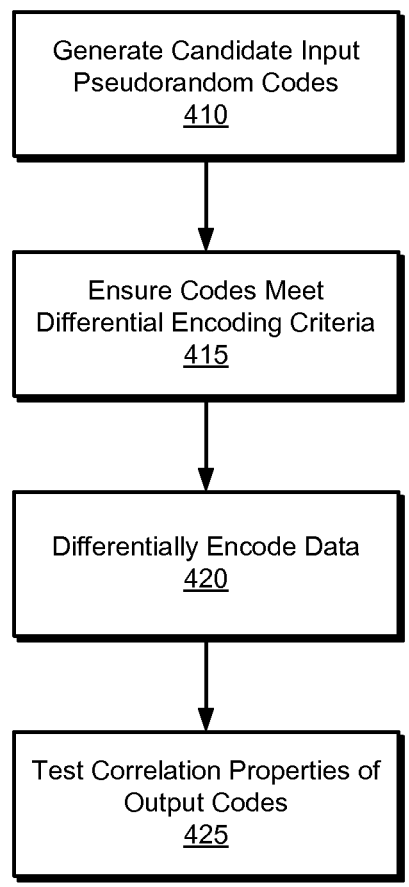
FIG. 4 is a flowchart illustrating operations in a method to generate codes for differential encoding operations, according to embodiments.

FIG. 4 is a flowchart illustrating operations in a method to generate codes for differential encoding operations, according to embodiments. Referring to FIG. 4, at operation 410 candidate pseudo-random codes are generated. In some embodiments pseudo-random codes may be generated using a random number generator to create candidate bit sequences of 0s and 1s.

At operation 415 it is determined whether the pseudo-random codes meet differential encoding criteria. For QPSK encoding the pseudo-random code the number of bits must be even and the sum of all bits having a value of 1 must be an even multiple of four. For BPSK encoding the number of bits must be even and the some of all bits having a value of 1 must be an even multiple of two.

The pseudo-random code(s) may be input into the differential encoder 212, which differentially encodes data (operation 420) and generates an output from the input pseudo-random code(s). Differentially encoding a long random sequence of 0s and 1s typically produces a new code with similar statistical properties as the input code. Thus there is a high probability that the output code generated by the differential encoder 212 has similar properties as the input code.

At operation 425 the correlation properties of the output codes generated by the differential encoder 212 are tested by correlating the input code with the output code. In general, a good set of code words will produce a low cross-correlation between code words in the set. The operations of FIG. 4 may be repeated until a suitable set of code words is determined. The set of codes may then be used in the differential encoding process depicted in FIG. 3.

In summary, the forced differential encoding scheme implemented by satellite communications systems presents a difficulty in using pseudo-random code sequences in message encoding because for every input code for transmission results in four possible output code broadcasts. This significantly complicates the correlation processing in the user receiver by increasing the memory, processing, and power requirements. Furthermore, it weakens the separation between the codes and increases the likelihood that one code might be mistaken for another in the correlation process. According to embodiments described herein, encoding data in the differential encoder 212 using codes which leave the differential encoder 212 in a known output state may be useful in delivering pseudo-random coded messages to users via a communication satellite. Using these techniques, timing and frequency information can be delivered to a user in attenuated environments (e.g., indoors) by sending pseudo-random messages from a satellite such as Iridium to a user located inside a structure. The user receiving the message benefits because the broadcast from the communications satellite is more powerful than GPS, and the pseudo-random coding technique provides an additional gain that allows the signal to be pulled out of the noise. Once received, these messages can provide information suitable for the user to self-locate. However, without loss of generality, the message delivered to the user code could be for any purpose.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method comprising:
    receiving, at a differential encoder, data for transmission while the differential encoder is in a first logical state; and
    encoding a portion of the data using a transmission code to generate an encoded signal, wherein the transmission code is selected from a set of code words, and wherein the transmission code is selected so that the differential encoder enters a second logical state that is different than the first logical state after encoding the portion of the data; and
    encoding a second portion of the data using a second transmission code to generate a second encoded signal, wherein the second transmission code is selected from the set of code words, and wherein the second transmission code is selected so that the differential encoder enters a third logical state that is different than the second logical state after encoding the second portion of the data.

2. The method of claim 1, wherein the transmission code is further selected so that the encoded signal includes a global positioning system (GPS) signal.

3. The method of claim 1, further comprising:
modulating the encoded signal to generate a modulated signal;
amplifying the modulated signal to generate an amplified signal; and
transmitting the amplified signal.

4. The method of claim 3, wherein transmitting the amplified signal includes transmitting a message burst, wherein the message burst includes the amplified signal and a second amplified signal corresponding to the second encoded signal, wherein the encoded signal includes a first Gray code, and wherein the second encoded signal includes a second Gray code.

5. The method of claim 1, further comprising:
modulating the second encoded signal to generate a second modulated signal;
amplifying the second modulated signal to generate a second amplified signal; and
transmitting the second amplified signal.

6. The method of claim 1, wherein the encoded signal comprises a global positioning system (GPS) signal, a Gray code signal, or a combination thereof.

7. The method of claim 1, wherein the set of code words comprises a first plurality of code words based on a super bit encoding scheme.

8. The method of claim 7, wherein the first plurality of code words includes a first code word based on the super bit encoding scheme, the first code word including a multi-bit sequence appended to a string of pseudo-random bits.

9. The method of claim 1, wherein a signal to noise ratio of the encoded signal is sufficiently high to enable a user device located within a building to acquire timing information.

10. The method of claim 1, wherein the differential encoder is located within a communication system that is used as a positioning system.

11. The method of claim 1, wherein the set of code words includes a first code word including a first 10 bit string of pseudo-random bits representing a logical zero, wherein the set of code words includes a second code word including a second 10 bit string of pseudo-random bits representing a logical one, and wherein the transmission code is selected from the first code word and the second code word.

12. The method of claim 1, wherein the differential encoder utilizes Quadrature Phase Shift Key (QPSK) modulation schemes.

13. The method of claim 1, wherein the differential encoder utilizes Binary Phase Shift Key (BPSK) modulation schemes.

14. The method of claim 1, wherein the differential encoder is within a mobile communication system.

15. The method of claim 1, wherein the differential encoder is within a stationary communication system.

16. A communication device comprising:
a differential encoder configured to:
receive data for transmission while the differential encoder is in a first logical state;
encode a portion of the data using a transmission code to generate an encoded signal, wherein the transmission code is selected from a set of code words, and wherein the transmission code is selected so that the differential encoder enters a second logical state that is different than the first logical state after encoding the portion of the data;
encode a second portion of the data using a second transmission code to generate a second encoded signal, wherein the second transmission code is selected from the set of code words, and wherein the second transmission code is selected so that the differential encoder enters a third logical state that is different than the second logical state after encoding the second portion of the data; and
a transmitter configured to transmit the encoded signal and the second encoded signal generated by the differential encoder.

17. The communication device of claim 16, wherein the transmission code is further selected so that the encoded signal includes a global positioning system (GPS) signal.

18. The communication device of claim 16, further comprising:
a modulator to modulate the encoded signal to generate a modulated signal; and
an amplifier to amplify the modulated signal to generate an amplified signal, wherein the transmitter is configured to transmit the amplified signal.

19. The communication device of claim 16, wherein the transmitter is configured to transmit a message burst, and wherein the message burst includes the encoded signal and the second encoded signal.

20. The communication device of claim 16, wherein the encoded signal includes a first Gray code, and wherein the second encoded signal includes a second Gray code.

21. The communication device of claim 16, wherein the encoded signal comprises a global positioning system (GPS) signal, a Gray code signal, or a combination thereof.

22. The communication device of claim 16, wherein the set of code words comprises a first plurality of code words based on a super bit encoding scheme.

23. The communication device of claim 22, wherein the first plurality of code words includes a first code word based on the super bit encoding scheme, the first code word including a multi-bit sequence appended to a string of pseudo-random bits.

24. The communication device of claim 16, wherein the set of code words includes a first code word including a first 10 bit string of pseudo-random bits representing a logical zero, wherein the set of code words includes a second code word including a second 10 bit string of pseudo-random bits representing a logical one, and wherein the transmission code is selected from the first code word and the second code word.

25. A method comprising:
receiving, at a differential encoder in a first logical state, data for transmission;
encoding a portion of the data using a transmission code to generate an encoded signal,
wherein the transmission code is selected from a set of code words, and wherein the transmission code is selected so that the differential encoder reenters the first logical state after encoding the portion of the data, and wherein transmitting the encoded signal includes transmitting a message burst; and
encoding a second portion of the data using a second transmission code to generate a second encoded signal, wherein the second transmission code is selected from the set of code words, and wherein the second transmission code is selected so that the differential encoder reenters the first state after encoding the second portion of the data.

26. The method of claim 25, wherein the transmission code is further selected so that the encoded signal includes a global positioning system (GPS) signal.

27. The method of claim 25, wherein the set of code words includes a first code word including a first 10 bit string of pseudo-random bits representing a logical zero, wherein the set of code words includes a second code word including a second 10 bit string of pseudo-random bits representing a logical one, and wherein the transmission code is selected from the first code word and the second code word.

28. The method of claim 25, further comprising:
modulating the encoded signal to generate a modulated signal;
amplifying the modulated signal to generate an amplified signal; and
transmitting the amplified signal.

29. The method of claim 25, further comprising transmitting the message burst to a mobile device.

30. The method of claim 29, wherein the mobile device is configured to use the encoded signal to determine a position of the mobile device.

31. The method of claim 25, wherein the set of code words comprises a first plurality of code words based on a super bit encoding scheme.

32. The method of claim 25, wherein the encoded signal includes a first Gray code, and wherein the second encoded signal includes a second Gray code.

33. The method of claim 25, wherein the differential encoder is located within a communication system that is used as a positioning system.

34. The method of claim 25, wherein the encoded signal comprises at least one of a global positioning system (GPS) signal, a Gray code signal, or a combination thereof.

35. The method of claim 25, wherein the differential encoder encodes the portion of the data using a Quadrature Phase Shift Key (QPSK) modulation scheme.

36. The method of claim 25, wherein the differential encoder encodes the portion of the data using a Binary Phase Shift Key (BPSK) modulation scheme.

37. A communication device comprising:
a differential encoder, the differential encoder configured to:
receive data for transmission while the differential encoder is in a first logical state; and
encode a portion of the data using a transmission code to generate an encoded signal, wherein the transmission code is selected from a set of code words, and wherein the transmission code is selected so that the differential encoder reenters the first logical state after encoding the portion of the data;
encode a second portion of the data using a second transmission code to generate a second encoded signal, wherein the second transmission code is selected from the set of code words, and wherein the second transmission code is selected so that the differential encoder reenters the first state after encoding the second portion of the data; and
a transmitter configured to transmit the encoded signal and the second encoded signal generated by the differential encoder.

38. The communication device of claim 37, wherein the transmission code is further selected so that the encoded signal includes a global positioning system (GPS) signal.

39. The communication device of claim 37, wherein the set of code words includes a first code word including a first 10 bit string of pseudo-random bits representing a logical zero, wherein the set of code words includes a second code word including a second 10 bit string of pseudo-random bits representing a logical one, and wherein the transmission code is selected from the first code word and the second code word.

40. The communication device of claim 37, further comprising:
a modulator to modulate the encoded signal to generate a modulated signal; and
an amplifier to amplify the modulated signal to generate an amplified signal, wherein the transmitter is configured to transmit the amplified signal.

41. The communication device of claim 37, wherein the transmitter is configured to transmit a message burst, and wherein the message burst includes the encoded signal and the second encoded signal.

42. The communication device of claim 37, wherein the encoded signal comprises a global positioning system (GPS) signal, a Gray code signal, or a combination thereof.

43. The communication device of claim 37, wherein the encoded signal includes a first Gray code and wherein the second encoded signal includes a second Gray code.

44. The communication device of claim 37, wherein the differential encoder is within a mobile communication system.

45. The communication device of claim 37, wherein the differential encoder is within a stationary communication system.

* * * * *